April 7, 1959     I. DAKLI ET AL     2,881,205
PROCESS FOR THE PRODUCTION OF ACRYLIC ACID ESTERS
Filed Feb. 11, 1957
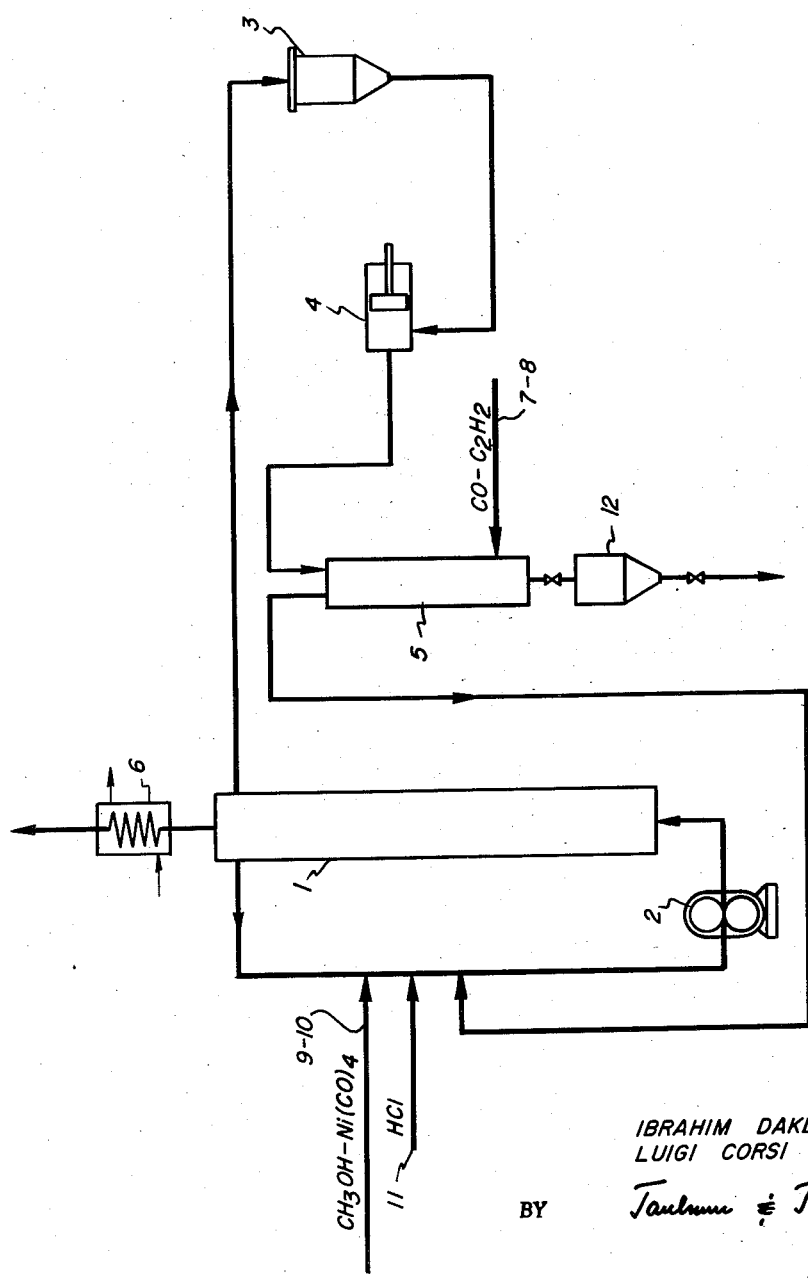
INVENTORS
IBRAHIM DAKLI
LUIGI CORSI
BY *Taulman & Taulman*
ATTORNEYS

2,881,205

PROCESS FOR THE PRODUCTION OF ACRYLIC ACID ESTERS

Ibrahim Dakli, Busto Arsizio, and Luigi Corsi, Milan, Italy, assignors to Montecatini Societa Generale per l'Industria Mineraria e Chimica, Milan, Italy Application February 11, 1957, Serial No. 639,421

Claims priority, application Italy February 16, 1956

4 Claims. (Cl. 260—486)

This invention relates to a new and improved process for the production of esters of acrylic acid.

Considerable work has been done on the production of acrylic acid esters in an attempt to provide a method for making the esters in high yields.

Various processes for preparing the esters in a single step under different operating conditions and starting from different raw materials, are known.

For instance, the esters can be prepared from acetylene, nickel carbonyl, the alcohol corresponding to the ester to be produced, and hydrochloric acid, at temperatures between 35° C. and 45° C. and under normal pressure, by means of the so-called "stoichiometric reaction":

$$4C_2H_2 + 4R\text{—}OH + Ni(CO)_4 + 2HCl \rightarrow 4CH_2=CH\text{—}COOR + NiCl_2 + H_2$$

As can be calculated from the equation, for each 100 parts of acrylic radical formed there are consumed 61 parts of nickel carbonyl, which is converted to nickel chloride. Expensive equipment and consumption of relatively large amounts of reagents are required in order to re-convert the by-product nickel chloride into nickel carbonyl for use in synthesizing further quantities of the acrylic ester. Moreover, the stoichiometric reaction is accompanied by several side reactions. Thus, the hydrogen which is formed in the reaction promotes the hydrogenation of the acrylate to propionate, which is difficult to separate from the acrylic monomer by the usual separation techniques. Also, if the acetylene is not diluted with other gases, it gives rise to the formation of undesirable high-boiling products resulting from condensation and polymerization reactions.

Another method that is known for the production of the acrylic acid esters is the so-called "catalytic synthesis" in which the esters are produced from acetylene, alcohol and carbon monoxide according to the following equation:

$$CH\equiv CH + R\text{—}OH + CO \rightarrow CH_2=CH\text{—}COOR$$

This reaction takes place, in the presence of more or less complex catalysts based on nickel halides, at temperatures between 150° C. and 180° C., and under a pressure of 20 to 30 atmospheres.

While some of the disadvantages which attend the stoichiometric reaction are avoided when the esters are prepared by the catalytic synthesis the latter has the drawback that it requires special equipment for handling corrosive reagents and acetylene under pressure. Furthermore, the catalytic synthesis involving the conditions mentioned is not well-adapted to the production of methyl acrylate in view of the high vapor pressure of methanol.

More recently, it has been found that the catalytic synthesis can be superimposed on the stoichiometric reaction, the conditions being such that the stoichiometric reaction is initiated first, the catalytic synthesis is then started in the same reactor, and after that both reactions are run simultaneously, to yield the acrylic ester under normal pressure.

In the art, it has been stressed that the stoichiometric reaction must be initiated in a first stage, the alcohol, hydrochloric acid, acetylene, and nickel carbonyl being introduced first into the reactor, and carbon monoxide being added only after the reaction has been started. In this way, the catalytic synthesis is superimposed on the already initiated stoichiometric reaction and then proceeds simultaneously with it. When the stoichiometric reaction ceases, the catalytic synthesis also ceases. In order to start the reactions running again, it is necessary to interrupt the introduction of carbon monoxide into the reactor, feed in the other reactants in the proportions required for the stoichiometric reaction, and then resume the introduction of the carbon monoxide only after the stoichiometric reaction has been re-initiated and is proceeding.

In fact, it is the opinion of those who developed the stoichiometric reaction, and of those who developed the catalytic synthesis, that if the carbon monoxide is introduced into a solution containing acrylate, nickel carbonyl, alcohol and hydrochloric acid, no reaction does or can possibly occur.

In all three of the prior art processes discussed above, reactants are used in proportions varying within certain limits, but in all three of those methods it is considered useful to use an excess of alcohol which is subsequently recovered. The final product contains nickel carbonyl which is decomposed in a separate reactor by treating the crude product with hydrochloric acid, alcohol and acetylene. While the decomposition treatment results in the production of further acrylate by the stoichiometric reaction, the procedure requires complementary equipment for feeding and metering the reactants.

It is a primary object of the present invention to provide a new and improved process for the production of the acrylic acid esters.

This and other objects are accomplished by the present invention in accordance with which we have found that, under certain conditions to be described hereinbelow, it is possible to initiate the formation of an acrylic acid ester directly by contacting acetylene, nickel carbonyl, the alcohol, carbon monoxide and hydrochloric acid simultaneously in the same reactor, under normal pressure and at a temperature of 35° C. to 65° C.

The conditions necessary for starting the reaction resulting in production of the acrylate even though the carbon monoxide is present with the other reactants are as follows: the volume ratio of acetylene to carbon monoxide in the gaseous feed during the induction period must be higher than 1.35, e.g., between 1.40:1 and 2:1, and preferably between 1.75:1 and 2.0:1, and the concentration of nickel carbonyl in the liquid circulating in the reactor must be between 0.5 and 13%, preferably between 2% and 6%.

We find that once the reaction is started, it is convenient, for its continuation, to adjust the volume ratio of gaseous acetylene to gaseous carbon monoxide to between 1.35 and 1.55, leaving unchanged the high concentration of nickel carbonyl in the reactor which we have found most suitable and efficient.

In this method in which the carbon monoxide is present with the other reactants from the beginning of operations, the concentration of hydrochloric acid present becomes the controlling and stabilizing factor once the acetylene/carbon monoxide ratio, the concentration of nickel carbonyl, and the optimum operating temperature have been established.

In feeding the nickel carbonyl to the reactor, its tendency to react with hydrochloric acid to form nickel chloride, and possible losses, must be taken into account.

The feed is adjusted so that a constant concentration of nickel carbonyl is maintained in the reactor.

It is advantageous to use an excess of the alcohol in carrying out the present method, not only for maintaining the reaction mass more fluid, but also because use of the excess alcohol inhibits or prevents side-reactions. An excess of alcohol of 50% to 250% based on either the total CO available or the acetylene, may be used. Oxidizing agents hinder the normal course of the reaction, even when present in only very small amounts, and are, therefore, avoided.

At the start of a continuous run, all of the reactants are introduced simultaneously into the reactor once the latter is charged with alchool and nickel carbonyl and possibly also contains some acrylic ester, or is charged with a solution from a previous run which solution may comprise, in addition to the above, nickel chloride and some secondary products.

Initially, in the practical operation of the process, it is preferred to introduce the acetylene and carbon monoxide at a lower rate of flow than the rate of flow established for carrying out the process. Once the reaction is started, the rate of flow of both gases is increased to the normal value. Evidence that the reaction has started can be obtained by measuring the unreacted gases at the outlet of the reactor. The flow of gases out of the reactor gradually decreases, until it ceases completely. At this point, the flow rates of the acetylene and carbon monoxide are brought to the normal values. The run is continued for the desired period of time. If an increase in the amount of gases is observed during a regular run, the feed of hydrogen chloride is increased temporarily until the gas outflow again decreases.

It appears that the reaction mechanism involved is very intricate. However, in accordance with various interpretations, it may be assumed to involve reversible intermediate reactions in which nickel carbonyl or derivatives thereof acts (act) as activating centers for carbon monoxide and acetylene.

The crude liquid reaction product contains 0.5% to 13% nickel carbonyl, the acrylate, the excess alcohol, and nickel chloride. In this present process, it is fed to a stripping unit maintained at 10° C. to 60° C., into which a gaseous stream of acetylene-carbon monoxide mixture, or a stream of carbon monoxide alone, is introduced countercurrent to the flow of the liquid reaction product and serves as the stripping medium or agent for the latter. The liquid reaction product and the gaseous stripping agent may be fed into the stripping unit in series, in parallel, or in series-parallel (compound feeding).

In passing through the stripping unit in countercurrent to the crude liquid product, the gas strips all of the nickel carbonyl contained therein from the liquid in the form of vapor, and also removes a large amount of the alcohol and a certain amount of the ester. The resulting vapor-laden gas is recycled to the main reactor and is used in the production of further quantities of the acrylic acid ester.

The liquid reaction product withdrawn from the stripping unit is free from nickel carbonyl and contains a smaller amount of alcohol than the crude liquid reaction product passed into the stripping unit. This is advantageous because it facilitates recovery of the acrylate in the pure state, while a portion of the excess alcohol is returned directly to the synthesis.

The stripped product is then submitted to treatment involving purification of the acrylic ester, recovery and recycling of part of the alcohol still present therein, and regeneration of the nickel carbonyl from the nickel chloride formed as by-product in the reaction.

It will be apparent that the method of the present invention presents various important advantages over the prior art processes for the synthesis of acrylic acid esters.

These advantages are obtained whether the process is carried out continuously or batchwise, but are particularly striking when, as is preferred, the process is carried out continuously. In the continuous process, once the operation has been started in a suitable reactor, the stream of acetylene and carbon monoxide proceeding to the reactor can be sent through the stripping unit, in countercurrent to the crude liquid reaction product proceeding from the reactor, to remove the nickel carbonyl and a portion of the excess alcohol in the reaction product, the gaseous stream being then sent directly into the reactor. A continuous circulation of the liquid reaction product and of the gaseous stream containing the acetylene and carbon monoxide is thus maintained throughout the operation. A comparatively simple plant comprising a minimum of moving parts can be used in producing the acrylate in high yields and for as long a period as required to produce the total quantity of ester desired in a given operation. Since, once the plant is set in operation, and the conditions are stabilized, introduction of the reactants and circulation of the crude liquid reaction product from the reactor to the stripping unit, and of the stream of acetylene carbon monoxide through the stripping unit to the reactor is automatic, a minimum of attention to the plant is required.

Some of the advantages are enumerated below:

(1) The apparatus required is extremely simple. Since the hydrochloric acid comes in contact with large amounts of nickel carbonyl in the reactor, no corrosion occurs and therefore anticorrosion measures do not have to be taken.

(2) Metering of the gaseous reactants is simplified since the same gas stream feeds the stripping unit and the reactor, in succession.

(3) The consumption of the reactants, especially of nickel carbonyl and hydrochloric acid, can be readily kept within the limits indicated, although a relatively high concentration, above 5%, of nickel carbonyl is maintained in the reactor. Nickel carbonyl and hydrochloric acid are consumed in stoichiometric ratio.

(4) Stripping of the liquid reaction product by means of the mixed gaseous acetylene and carbon monoxide, or the carbon monoxide alone, permits recycling of the reactor of all the nickel carbonyl present in the crude product, as well as a part of the excess alcohol used, before the crude product is submitted to the subsequent extraction and rectification steps. Moreover, in the stripping operation, the gas is subjected to purification and drying before passing into the reactor, to thereby avoid or limit the introduction of impurities and water into the reactor. This insures that the reaction proceeds more regularly, and appreciably increases the yield of acrylate obtained, since water reacts with acetylene and carbon monoxide to produce acrylic acid which cannot be recovered economically. The stripping step forming a part of the present method, and as carried out in the practice of the invention, permits an increase to the maximium of the concentration of nickel carbonyl in the reaction liquid.

The present process can be used for the preparation of acrylic acid esters of aliphatic alcohols of the formula ROH in which R is an alkyl group and may be small or large, primary, secondary or tertiary, straight-chained or branched. Typical groups which may be represented by R include methyl, ethyl, propyl, butyl, amyl, hexyl, octyl, nonyl, decyl, dodecyl, hexadecyl and octadecyl or even larger groups, in their different isomeric forms. Acrylic acid esters of cycloaliphatic and arylaliphatic alcohols, such as benzyl, methylbenzyl, phenylethyl, cyclohexylethyl etc. may also be produced.

When alcohols of higher molecular weight, such as amyl alcohol and higher alcohols, are used, it is necessary to use a solvent, preferably a relatively low-boiling solvent, which is inert under the reaction conditions, in order to maintain the reaction mass sufficiently fluid and facilitate the reaction by permitting the reactants to be brought into intimate contact with each other.

Organic solvents which meet the requirements and may be used as diluents include dioxane, benzene, toluene, ethylene dichloride, chloroform, carbon tetrachloride, ethyl acetate, acetone, methylethylketone, isopropyl ether and the like.

Hydrogen bromide may be used instead of hydrogen chloride.

In practice, in order to insure a regular course of the reaction, it is preferable to introduce the reactants at different points of the reactor. The nickel carbonyl and the alcohol can be introduced into the reactor at any point. However, it is preferred that such point, following the direction of the liquid flow, be located after the spot at which the reaction product is withdrawn. The hydrochloric acid is introduced in advance of the acetylene and carbon monoxide, or together with them.

The liquid is circulated vigorously in the reactor by means of a pump, upwardly through the reaction column and then downwardly through a pipe extending along the side of the reactor, to the bottom of the column. The nickel carbonyl may be introduced into the gaseous phase. The gases may be introduced either at the bottom of the reaction column or at the top of the side pipe, and pass through the reactor equicurrently to the liquid. It is not necessary to fill the reactor with rings or similar devices or materials in order to obtain effective mixing of the liquid with the gas. The circulation of the reagents itself promotes effective mixing thereof.

The reaction is highly exothermic. It is necessary, therefore, to provide cooling means for carrying off heat of the reaction and for maintaining the temperature constant.

The stripping column may have different structures, but a simple column packed with Rasching rings and provided at the bottom with a boiler, where the gases are introduced, is satisfactory.

The process of the invention can be performed continuously as described hereinabove, or on a batch basis.

The following examples are given to illustrate the invention, it being understood that these examples are not intended as limiting.

Apparatus suitable for carrying out the method of the examples is shown in the accompanying drawing, the single figure of which is a schematic showing which is described and explained in detail in Example 1 below.

*Example 1*

Twenty-nine mols of methyl acrylate, 71.8 mols of methanol and 1.54 mols of nickel carbonyl are introduced into the reactor 1 of the continuous plant shown in the drawing. The pump 2 for circulating the reaction liquid is turned on and the temperature is raised to 50° C. To initiate the reaction, the following reagents are then fed into reactor 1:

11.2 mols/h. methanol
0.225 mol/h. of nickel carbonyl
0.446 mol/h. of gaseous hydrochloric acid
1.77 mols/h. of acetylene and
0.93 mol/h. of carbon monoxide The methanol and nickel carbonyl are fed into the reactor through the line designated 9—10, while the hydrogen chloride is fed through line 11, and the line designated 7—8 is used for feeding in the acetylene and carbon monoxide.

As soon as the outflow of unreacted gas (6) from the reactor 1 ceases, the feeding rates for the acetylene and carbon monoxide are increased to 5.24 mols/h. and 3.75 mols/h. respectively, which are the flow rates for those two reactants normally maintained throughout the run once the reaction is initiated.

The reaction proceeds in a normal manner, the conversion of the gases reaching 97%–99%.

The unreacted gases are cooled to about −20° C. in (6) to condense the major portion of the nickel carbonyl and nearly all of the methanol and acrylate entrained in the form of vapors, the condensed reagents being recycled to reactor 1. The remaining unreacted gases are vented.

The crude liquid reaction product, containing, besides the acrylate, about 4–5% nickel carbonyl, the excess methanol, nickel chloride and secondary reaction products, is discharged through an overflow pipe into container 3 from which it is transferred by means of pump 4 to the stripping column 5, entering the column at the top thereof and flowing downwardly through the column counter current to the stripping medium (acetylene and carbon monoxide) entering column 5 through lines 7—8 and flowing upwardly through the column. The gas entrains all of the nickel carbonyl, and part of the methanol and of the acrylic ester, present in the crude reaction product which, after being stripped, and free of nickel carbonyl, flows out of column 5 into the collection vessel 12, and thence directly (without any further treatment with acids) to a stage at which the acrylic ester is recovered.

The gas leaving the top of column 5 is recycled to reactor 1.

The yield of methylacrylate is 85% based on the carbon monoxide and methanol used; 78% based on the acetylene used. The methyl acrylate obtained is entirely colorless and suitable for use in the preparation of polymers and copolymers having excellent properties.

*Example 2*

150 mols methanol and 1.6 mols nickel carbonyl are introduced into the reactor of the apparatus described in Example 1. The pump 2 for the circulation of the reacting liquid is turned on, the temperature is raised to 50° C., and feeding of the various reactants is begun as described in Example 1. After a gaseous mixture consisting of carbon monoxide and acetylene has been fed in for 10–20 minutes, the reaction starts with total absorption of the gases introduced. At this point the flow rates of acetylene and carbon monoxide are increased up to the values pre-established for the regular run, and the reaction is continued for the desired period of time. After the reaction has started, the content of the reactor becomes gradually richer in methyl acrylate and nickel chloride until running concentrations are reached. The yields, based on the raw materials used, as well as the properties of the produced acrylate are the same as in Example 1.

*Example 3*

Twenty mols ethyl acrylate, 61 mols ethyl alcohol, and 1.80 mols nickel carbonyl are introduced into the reactor of the apparatus described in Example 1.

Circulation of the solution is started and the temperature is raised to 46° C. As soon as this temperature is reached, a simultaneous introduction of 0.52 mol/h. gaseous hydrochloric acid, 1.77 mols/h. acetylene, 0.93 mol/h. carbon monoxide, 0.262 mol/h. nickel carbonyl and 10.65 mols/h. anhydrous ethyl alcohol is begun. After about 10–20 minutes the reaction starts and the outflow of gas from the reactor stops. The feeding rates of acetylene and carbon monoxide are then increased to 5.3 mols/h. and 3.68 mols/h. respectively.

The reaction product, containing 5–6% nickel carbonyl, is discharged through the overflow into the container and then passed to the top of the stripping column, kept at 45° C., into the bottom of which carbon monoxide and acetylene are introduced. The gas passes through the column countercurrently to the liquid, thereby removing in the form of vapor all the nickel carbonyl, part of the ethanol and part of the ethyl acrylate contained in the crude product. From the stripping column, the vapor-laden gas enters the reactor 1 in which 99% of it is converted. The operation is continued for the desired period of time. The product discharged from the stripping column, consisting of a slurry containing mainly ethyl acrylate, ethyl alcohol, nickel chloride in suspension, and small amounts of compounds from side reaction, is transferred (without any further treatment) to the recovery of the acrylic ester by separation and distillation. The overall yield of distilled ethyl acrylate is 76% on the acetylene and 85% on the total carbon monoxide introduced, as such and in the form of nickel carbonyl. In the reaction, 0.26 mol nickel carbonyl and 0.52 mol hydrochloric acid are used per 3.8 mols gaseous carbon monoxide.

*Example 4*

Twenty-five mols methyl acrylate, 80 mols methanol and 1.6 mols nickel carbonyl are introduced into the reactor of Example 1. The temperature is raised to 50° C. while circulating the liquid through the reactor, and a feed of 14 mols/h. methanol, 0.225 mol/h. nickel carbonyl, 0.446 mol/h. hydrogen chloride, 1.77 mols/h. acetylene and 0.93 mol/h. gaseous carbon monoxide is started.

As soon as the reaction has started, as indicated by the practically complete absorption of the gases, the feed of acetylene and carbon monoxide is brought to 5.30, and 3.9 mols/h., respectively, while the amount of the other reactants in the feed remains unchanged. In a three hour run, with an acetylene conversion of the order of 98%, yields slightly higher than in Example 1 were obtained.

The invention provides a relatively very simple economical uncomplicated, and reliably reproducible method for producing the acrylic acid esters, eliminating the need to initiate a separate stoichiometric reaction and permitting direct use of the catalytic synthesis. The present method also has the advantage that a larger portion (up to 90%) of the carbon monoxide required for the reaction is derived from CO gas rather than from nickel carbonyl, which means that less nickel carbonyl has to be recovered from the reaction product, and that the latter also contains less nickel chloride which must be converted to nickel carbonyl for an efficient and economical operation.

Some changes may be made in practicing our invention, such as changes in the conditions for making our compounds, without departing from our invention. It is to be understood, therefore, that we intend to claim as part of our invention any variations, substitutions and changes that lie within the scope of our invention and of the appended claims, and intend to include within the scope of said claims such changes as may be apparent to those skilled in the art in the practice of the principles of our invention as set forth in this specification.

What is claimed is:

1. A process for producing acrylic acid esters of lower saturated aliphatic alcohols in which the formation of the ester is initiated directly from acetylene, carbon monoxide and the alcohol corresponding to the ester to be produced, in the presence of nickel carbonyl and hydrogen chloride, which process comprises simultaneously introducing a gaseous stream containing acetylene and carbon monoxide in a molar ratio between 1.75:1 and 2:1, nickel carbonyl and hydrogen chloride in stoichiometric ratio with respect to each other, and the alcohol, into a circulating liquid body consisting of the alcohol and from 0.5% to 13% by weight of nickel carbonyl, circulating the liquid reaction mass under normal atmospheric pressure and at a temperature of 35° C. to 65° C., while continuing to maintain the nickel carbonyl in the circulating liquid reaction mass at from 0.5% to 13% and continuing to simultaneously introduce the acetylene, carbon monoxide, alcohol, nickel carbonyl, and hydrogen chloride into the liquid, until the escape of unreacted gases from the circulating liquid ceases, continuing to simultaneously introduce said reactants into the circulating liquid reaction mass after the escape of gas therefrom ceases but with the molar ratio of gaseous acetylene to gaseous carbon monoxide adjusted to between 1.35:1 and 1.55:1, after such adjustment using the hydrogen chloride as a controlling and stabilizing agent for maintaining the reaction conditions constant by increasing the feed of hydrogen chloride to the circulating liquid reaction mass whenever unreacted gases emerge from the mass and until such emergence ceases, continuing to circulate the mass at normal pressure and the temperature of 35° C. to 65° C. until the acrylic acid ester is produced, and recovering the ester from the crude liquid reaction product.

2. The process according to claim 1, characterized in that the alcohol is methanol.

3. The process according to claim 1, characterized in that the alcohol is ethanol.

4. The process according to claim 1, characterized in that the acrylic acid ester is recovered from the crude liquid reaction product by contacting the latter with a gaseous stream of acetylene and carbon monoxide which strips all of the nickel carbonyl therefrom, and then purifying the stripped product.

References Cited in the file of this patent

UNITED STATES PATENTS

| | | |
|---|---|---|
| 2,582,911 | Neher et al. | Jan. 15, 1952 |
| 2,653,969 | Albrecht et al. | Sept. 29, 1953 |
| 2,778,848 | Neuman et al. | Jan. 22, 1957 |